J. Z. ROBERGE.
AUTOMOBILE TOOL.
APPLICATION FILED NOV. 22, 1918.
1,339,289.
Patented May 4, 1920.
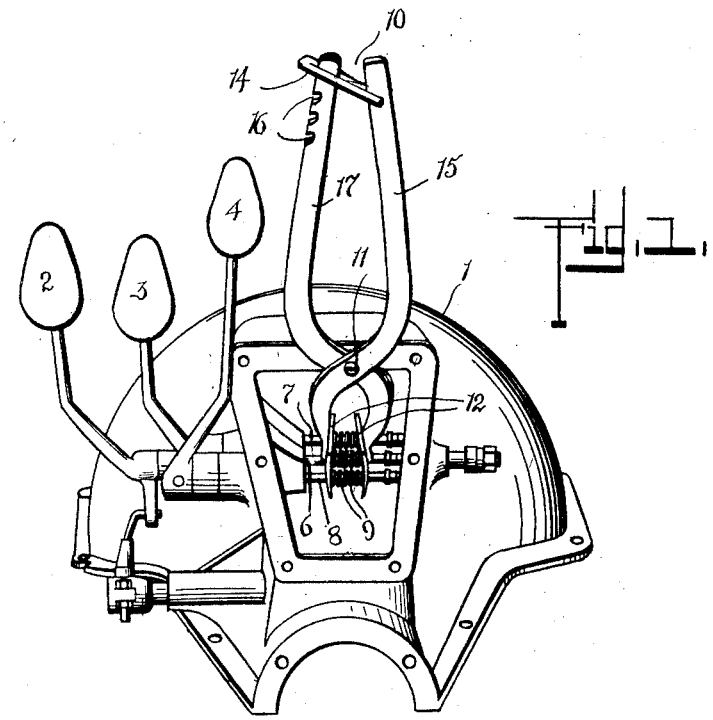
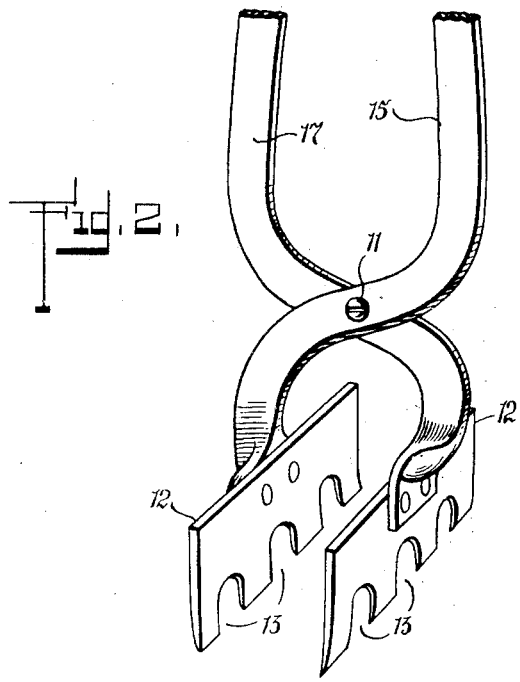
INVENTOR
James Z. Roberge
BY
John M. Spellman
ATTORNEY

UNITED STATES PATENT OFFICE.

JAMES Z. ROBERGE, OF DALLAS, TEXAS.

AUTOMOBILE-TOOL.

1,339,289.   Specification of Letters Patent.   Patented May 4, 1920.

Application filed November 22, 1918. Serial No. 263,698.

*To all whom it may concern:*

Be it known that I, JAMES Z. ROBERGE, a citizen of the United States, residing at Dallas, in the county of Dallas and State of Texas, have invented certain new and useful Improvements in Automobile - Tools, of which the following is a specification.

My invention relates to improvements in automobile tools and especially relates to tools for use with the Ford type of automobile.

On the Ford make of automobile the transmission gears are of the type known as the planetary gears which gears are controlled or operated principally by foot pedals, as for instance the slow speed pedal, brake pedal and reverse pedal, each pedal being connected to a separate band, the bands encircling respectively the slow speed (or clutch) drum, the brake drum and the reverse drum. These bands are tightened or loosened on the drums by the action of springs in connection with the pedals, and when necessary to take off a band or bands for repairing, adjusting, etc., it is difficult to hold the springs away from the bands.

The principal object of my invention is the provision of a tool which will remove this difficulty in that it will hold the springs away from the bands and allow the bands to be removed and replaced or adjusted, when necessary.

Another object of my invention is the provision of a tool of this character which is very simple in construction and operation and cheaply manufactured.

My invention consists of a tong shaped device, the lower ends or gripping portion of same adapted to fit over and straddle the rods holding the brake bands and springs of the transmission gears, giving the tool a good grip to bear against the springs. The two portions of the tool when pressed together and the springs drawn away from the brake bands are locked by a wire loop or link on the upper part of the device.

My invention will be more fully understood from the following description taken in connection with the accompanying drawings forming part hereof, in which—

Figure 1 is a perspective view of the top portion of a transmission cover of a Ford automobile, showing my automobile tool in operation, and Fig. 2 is a perspective detail view of the device, the top part being broken away.

Referring to the drawings; 1 represents the transmission cover of a Ford automobile and 2, 3 and 4 the clutch, reverse and brake pedals respectively, with corresponding rods 6, 7 and 8 to which are connected the clutch, reverse and brake bands (not shown). The pedals coöperate with the bands in connection with the springs 9 to tighten or loosen the bands on the drums of the transmission gears.

My automobile tool or device 10 is shown in operative position in Fig. 1. The tool resembles a pair of tongs, each portion or arm bent or curved in the manner shown the two arms connected by a pivot 11. Affixed to the lower ends of the two arms of the tool are plates 12—12 with their lower edges slightly curved inward or beveled and having slots or openings 13—13 which fit over or straddle the rods or pedal shafts 6, 7 and 8 when the springs are to be contracted to release their tension on the bands. The plates 12—12 are parallel to each other and in alinement with the pivot 11.

When the tool is placed in position and the springs 9 are compressed (as in Fig. 1) a wire link or bail 14, pivotally attached to one of the arms 15 of the tool is brought over and slipped in one of the notches 16 in the other portion 17 and the mechanic can then proceed to repair or readjust the brake bands, etc., without interruption, the springs 9 being held securely in retracted position away from the lugs on the bands.

Having thus described the nature and objects of my invention, what I claim as new and desire to secure by Letters Patent is—

1. In an automobile tool of the character described two relatively short arms crossing each other a short distance below their centers and pivotally connected at their points of intersection, the longer portions of said arms being bent outward and upward to form handles, the shorter portions being bent outward and downward and a plate secured to each of the downwardly bent ends, each of said plates having a plurality of notches to grip and compress simultaneously a plurality of springs used in the transmission device of a Ford automobile, the lower edges of said plates being beveled and curved slightly inward.

2. In an automobile tool of the character described two relatively short arms crossing each other a short distance below their centers and pivotally connected at their points of intersection, the longer portions of said arms being bent outward and upward to form handles, the shorter portions being bent outward and downward and a plate secured to each of the downwardly bent ends, each of said plates having a plurality of notches to grip and compress simultaneously a plurality of springs used in the transmission device of a Ford automobile, the lower edges of said plates having beveled edges and curved slightly inward, and fastening means adapted to embrace the free ends of the arms and lock the same together.

3. An automobile tool of the character described, consisting of a pair of tongs and a plate secured to the lower end of each arm, each of said plates having a plurality of notches to engage a like number of springs in the transmission device of a Ford automobile, said plates extending opposite to each other at right angles to the arms of the tongs but parallel with the pivotal connection for said tongs.

In testimony whereof I have signed my name to this specification.

JAMES Z. ROBERGE.